US00RE35696E

United States Patent [19]

Mikus

[11] E Patent Number: Re. 35,696

[45] Reissued Date of Patent: Dec. 23, 1997

[54] HEAT INJECTION PROCESS

[75] Inventor: Thomas Mikus, Houston, Tex.

[73] Assignee: Shell Oil Company, Houston, Tex.

[21] Appl. No.: 534,902

[22] Filed: Sep. 28, 1995

Related U.S. Patent Documents

Reissue of:

[64] Patent No.: 5,255,742
Issued: Oct. 26, 1993
Appl. No.: 896,861
Filed: Jun. 12, 1992

[51] Int. Cl.[6] ..... E21B 36/02

[52] U.S. Cl. ..... 166/303; 166/59

[58] Field of Search ..... 166/303, 302, 166/59, 272, 271, 245, 260, 261; 431/7, 328, 329; 110/260, 342

[56] References Cited

U.S. PATENT DOCUMENTS

| | | |
|---|---|---|
| 1,972,259 | 9/1934 | Brassert . |
| 2,472,445 | 6/1949 | Sprong . |
| 2,484,063 | 10/1949 | Ackley . |
| 2,634,961 | 4/1953 | Ljungstrom . |
| 2,731,195 | 1/1956 | Ljungstrom . |
| 2,804,149 | 8/1957 | Kile . |
| 2,902,270 | 9/1959 | Salmonsson et al. . |
| 2,914,309 | 11/1959 | Salmonsson . |
| 2,923,535 | 2/1960 | Ljungstrom . |
| 2,954,826 | 10/1960 | Sievers . |
| 3,095,031 | 6/1963 | Eurenius et al. . |
| 3,105,545 | 10/1963 | Prats et al. . |
| 3,106,244 | 10/1963 | Parker . |
| 3,113,623 | 12/1963 | Krueger . |
| 3,114,417 | 12/1963 | McCarthy . |
| 3,131,763 | 5/1964 | Kunetka et al. . |
| 3,137,347 | 6/1964 | Parker . |
| 3,139,928 | 7/1964 | Broussard . |
| 3,142,336 | 7/1964 | Doscher . |
| 3,163,745 | 12/1964 | Boston . |
| 3,164,207 | 1/1965 | Thessen et al. . |
| 3,181,613 | 5/1965 | Kreuger . |
| 3,191,679 | 6/1965 | Miller . |
| 3,205,946 | 9/1965 | Prats et al. . |
| 3,207,220 | 9/1965 | Williams . |
| 3,208,521 | 9/1965 | Holland et al. . |

(List continued on next page.)

FOREIGN PATENT DOCUMENTS

| | | |
|---|---|---|
| 123137 | 11/1948 | Sweden . |
| 123138 | 11/1948 | Sweden . |
| 125712 | 8/1949 | Sweden . |
| 126674 | 9/1949 | Sweden . |

OTHER PUBLICATIONS

J. E. Bridges, et al. "Net Energy Recovery for the In Situ Dielectric Heating of Oil Shale", Oil Shale Symposium. Proc. 11, 311–330 (1978), *Chem. Abstr.*, Abstract No. 74156 v. 90 N. 9–10.

IVA 24 (1953):3; "Bräsleproblemen i blickpunkten", pp. 118–123.

Salomonsson, Goesta, Chief Engineer: Underground Shale Oil Pyrolysis according to the Ljungstroem Method [Underjordisk Skifferpyrolysis enligt Ljungstroometoden], IVA, vol. 24 (1953), No. 3, pp. 118–123.

Translation of the claims of Swedish Patent specification No. 123.136 filed by Svenska Skifferoljeaktiebolaget, Örebro, Sweden.

*Primary Examiner*—Frank S. Tsay
*Attorney, Agent, or Firm*—Del S. Christensen

[57] ABSTRACT

A method for heat injection into a subterranean formation is provided. The method utilizes flameless combustion. The absence of a flame eliminates the flame as a radiant heat source and results in a more even temperature distribution throughout the length of the burner. Flameless combustion is accomplished by preheating the fuel and the combustion air to a temperature above the autoignition temperature of the mixture. Preheating hydrocarbon fuel requires the inclusion of a carbon formation suppressant such as carbon dioxide or steam to prevent carbon formation.

9 Claims, 3 Drawing Sheets

U.S. PATENT DOCUMENTS

| | | | |
|---|---|---|---|
| 3,250,327 | 5/1966 | Crider . | |
| 3,284,281 | 11/1966 | Thomas . | |
| 3,338,306 | 8/1967 | Cook . | |
| 3,342,267 | 9/1967 | Cotter et al. . | |
| 3,379,252 | 4/1968 | Heckler et al. . | |
| 3,389,975 | 6/1968 | Van Nordstrand . | |
| 3,455,391 | 7/1969 | Matthews et al. . | |
| 3,468,376 | 9/1969 | Slusser et al. . | |
| 3,501,201 | 3/1970 | Closman et al. . | |
| 3,507,332 | 4/1970 | Venable et al. . | |
| 3,547,192 | 12/1970 | Claridge et al. . | |
| 3,547,193 | 12/1970 | Gill . | |
| 3,572,838 | 3/1971 | Templeton . | |
| 3,595,642 | 7/1971 | Miller . | |
| 3,613,785 | 10/1971 | Closman et al. . | |
| 3,616,857 | 11/1971 | Pitkethly et al. . | |
| 3,620,300 | 11/1971 | Crowson . | |
| 3,757,860 | 9/1973 | Pritchett . | |
| 3,807,227 | 4/1974 | Smith, Jr. . | |
| 3,848,671 | 11/1974 | Kern . | |
| 3,864,969 | 2/1975 | Smith, Jr. . | |
| 3,874,450 | 4/1975 | Kern . | |
| 3,880,235 | 4/1975 | Berry et al. . | |
| 3,892,128 | 7/1975 | Smith, Jr. . | |
| 3,916,993 | 11/1975 | Katz . | |
| 3,920,072 | 11/1975 | Kern . | |
| 3,946,809 | 3/1976 | Hagedorn . | |
| 3,948,319 | 4/1976 | Pritchett . | |
| 3,954,140 | 5/1976 | Hendrick . | |
| 3,958,636 | 5/1976 | Perkins . | |
| 3,972,372 | 8/1976 | Fisher et al. . | |
| 3,981,187 | 9/1976 | Howell . | |
| 3,988,036 | 10/1976 | Fisher et al. . | |
| 3,989,107 | 11/1976 | Fisher et al. . | |
| 3,994,341 | 11/1976 | Anderson et al. . | |
| 4,008,761 | 2/1977 | Fisher et al. . | |
| 4,008,762 | 2/1977 | Fisher et al. . | |
| 4,010,799 | 3/1977 | Kern et al. . | |
| 4,013,538 | 3/1977 | Schneider et al. . | |
| 4,037,655 | 7/1977 | Carpenter . | |
| 4,067,390 | 1/1978 | Camacho et al. . | |
| 4,079,784 | 3/1978 | Howard et al. . | |
| 4,084,637 | 4/1978 | Todd . | |
| 4,084,638 | 4/1978 | Whiting . | |
| 4,084,639 | 4/1978 | Todd . | |
| 4,116,273 | 9/1978 | Fisher et al. . | |
| 4,135,579 | 1/1979 | Rowland et al. . | |
| 4,137,968 | 2/1979 | Howard et al. . | |
| 4,140,179 | 2/1979 | Kasevich et al. . | |
| 4,140,180 | 2/1979 | Bridges et al. . | |
| 4,144,935 | 3/1979 | Bridges et al. . | |
| 4,159,743 | 7/1979 | Rose et al. | 166/59 |
| 4,193,448 | 3/1980 | Jeambey . | |
| 4,193,451 | 3/1980 | Dauphine . | |
| 4,196,329 | 4/1980 | Rowland et al. . | |
| 4,199,025 | 4/1980 | Carpenter . | |
| 4,228,853 | 10/1980 | Harvey et al. . | |
| 4,243,098 | 1/1981 | Meeks et al. | 166/59 |
| 4,289,204 | 9/1981 | Stewart . | |
| 4,301,865 | 11/1981 | Kasevich et al. . | |
| 4,320,801 | 3/1982 | Rowland et al. . | |
| 4,359,091 | 11/1982 | Fisher et al. . | |
| 4,359,627 | 11/1982 | Takeichi . | |
| 4,375,302 | 3/1983 | Kalmar . | |
| 4,384,613 | 5/1983 | Owen et al. . | |
| 4,390,062 | 6/1983 | Fox | 166/59 |
| 4,401,162 | 8/1983 | Osborne . | |
| 4,412,585 | 11/1983 | Bouck . | |
| 4,415,034 | 11/1983 | Bouck . | |
| 4,444,258 | 4/1984 | Kalmar . | |
| 4,460,352 | 2/1987 | Vanmeuers et al. . | |
| 4,572,299 | 2/1986 | Vanegmond et al. . | |
| 4,585,066 | 4/1986 | Moore et al. . | |
| 4,589,488 | 5/1986 | Schirmer | 166/59 |
| 4,616,705 | 10/1986 | Stegemeier et al. . | |
| 4,626,665 | 12/1986 | Fort, III . | |
| 4,704,514 | 11/1987 | Van Egmond et al. . | |
| 5,060,287 | 10/1991 | Van Egmond . | |
| 5,065,818 | 11/1991 | Van Egmond . | |

HEAT INJECTION PROCESS

Matter enclosed in heavy brackets [ ] appears in the original patent but forms no part of this reissue specification; matter printed in italics indicates the additions made by reissue.

RELATED PATENTS

This invention is related to copending U.S. patent application Ser. Nos. 897,641 and 896,864.

FIELD OF THE INVENTION

This invention relates to a method for injection of heat into a subterranean formation.

BACKGROUND OF THE INVENTION

U.S. Pat. Nos. 4,640,352 and 4,886,118 disclose conductive heating of subterranean formations of low permeability that contain oil to recover oil therefrom. Low permeability formations include diatomites and oil shales. Formations of low permeability are not amenable to secondary oil recovery methods such as steam, carbon dioxide, or fire flooding. Flooding materials tend to penetrate formations that have low permeabilities preferentially through fractures. The injected materials bypass most of the formation hydrocarbons. In contrast, conductive heating does not require fluid transport into the formation. Oil within the formation is therefore not bypassed as in a flooding process. When the temperature of a formation is increased by conductive heating, vertical temperature profiles will tend to be relatively uniform because formations generally have relatively uniform thermal conductivities and specific heats. Transportation of hydrocarbons in a thermal conduction process is by pressure drive, vaporization, and thermal expansion of oil and water trapped within the pores of the formation rock. Hydrocarbons migrate through small fractures created by the expansion and vaporization of the oil and water.

When the formation contains high molecular weight oil or hydrocarbon solids, thermal conduction could also result in pyrolysis of the hydrocarbons in-situ. The products of the pyrolysis will be of lower molecular weights and will therefore be more valuable than the original oil. Pyrolysis of solids also creates additional voids within the formation rocks. These voids provide additional hydrocarbon mobility.

Considerable effort has been expended to develop electrical resistance heaters suitable for injecting heat into formations having low permeability. U.S. Pat. Nos. 5,065,818 and 5,060,287 are exemplary, of such effort. Electrical heating of formations is relatively expensive compared to directly burning a hydrocarbon fuel. It would be preferable to provide a heat injection method in which directly burns a hydrocarbon fuel.

Gas fueled well heaters that are useful for heating formations to temperatures sufficient for ignition of in-situ fire floods are disclosed in U.S. Pat. Nos. 3,095,031; 3,880,235; 4,079,784; and 4,137,968. Provisions for the return of combustion gases to the 4,137,968. Provisions for the return of combustion gases to the surface are not required because the combustion gases are injected into the formation. The fuel gas and combustion air also remain relatively cool as they go down a borehole toward the burner because combustion gases rising in the borehole do not heat the burner. Additionally, a long service life is not required due to the short time period during which the burner is needed. These burners are therefore not suitable for use as heat injectors and do not overcome the shortcomings of the prior art heat injector burners.

Gas fueled heaters which are intended to be useful for heat injection are disclosed in U.S. Pat. No. 2,902,270 and Swedish Patent No. 123,137. These burners utilize flames to combust fuel gas. The existence of flames cause hot spots within the burner and in the formation surrounding the burner due to radiant heat transfer from the luminous portion of the flame. A typical gas flame provides about a 1650° C. radiant heat source. Materials of construction for the burners must be sufficient to withstand the temperatures of these hot spots. The heaters are therefore more expensive than a comparable heater without flames. The heater of Swedish Patent 123,137 would appear to result in a flameless combustion such as the present invention if the combustion air and the fuel gas were heated to a temperature above the autoignition temperature of the mixture. But due to the shallow depths of the heat injection wells disclosed in that patent, the components do not appear to be heated to this extent by the combustion gases. Further, radiant heat transfer from the flames appears to be critical in obtaining the temperature profile indicated in FIG. 2 of the Swedish patent because little heat is transferred from the well bore to the formation above the borehole containing flames. Due to the existence of flames, the service life and the operating temperatures of these burners are unacceptably limited.

The Swedish patent also addresses the problem of creation of carbon from hydrocarbon gases at elevated temperatures. The carbon is removed by exchanging services between the air and the fuel lines. Any carbon deposited in a line while the line is in fuel service is removed when the line is in combustion air service. This requires that the fuel gas lines be as large as the combustion air lines. Because about ten moles of combustion air ar required for each mole of methane burned, and because combustion air is generally optimally supplied at a lower pressure, a fuel gas line will have to be considerably larger to also accommodate combustion air flow service. The burner would therefore be considerably more expensive than one in which services of these two conduits are not interchangeable.

The Swedish patent also discloses that "before the gas is brought into the gas tube . . . it can through suitable preparation in a was known in the gas technique be given such a composition that it does not deposit coke." It is not clear what this statement means, but it likely is suggesting that hydrocarbons heavier than methane or ethane be removed by cryogenic distillation to reduce the tendency of the gas to form coke.

U.S. Pat. Nos. 3,113,623 and 3,181,613 disclose gas fired heat injection burners for heating subterranean formations. These burners utilize porous materials to hold a flame and thereby spreading the flame out over an extended length. Radiant heat transfer from a flame to the casing is avoided by providing the porous medium to hold the flame. But for combustion to take place in the porous medium, the fuel gas and the combustion air must be premixed. If the premixed fuel gas and combustion air were at a temperature above the autoignition temperature of the mixture, they would react upon being mixed instead of within the porous medium. The formations utilized as examples of these inventions are only up to fifty feet thick and below only about fifteen feet of overburden. The fuel gas and the combustion air are therefore relatively cool when they reach the burner. The burner would not function at it was intended if the formation being heated were significantly deeper.

It is therefore an object of the present invention to provide a method to inject heat into a subterranean formation using a fuel gas combustor which does not require a flame in the borehole during the heating process. It is a further object to provide such a method which does not require complicated equipment within the borehole. It is another object of the present invention to provide a method which has a high level of thermal efficiency.

SUMMARY OF THE INVENTION

These and other objects are accomplished by a method of heating a subterranean formation comprising at least one borehole providing communication from the surface to the subterranean formation to be heated, the method comprising:

combining a hydrocarbon fuel gas with a carbon formation suppressant;

passing the fuel gas and carbon formation suppressant mixture through a fuel gas conduit to a mixing point within the borehole juxtapose to the formation to be heated;

passing a combustion air stream though an air conduit to the mixing point;

preheating either the fuel gas and carbon formation suppressant mixture, the combustion air stream or both such that the temperature of a mixture of the streams exceeds an autoignition temperature of the mixture of the streams;

combining the preheated combustion air and fuel gas and carbon formation suppressant at the mixing point resulting in autoignition forming combustion products; and passing the combustion products through the borehole from the mixing point to the surface, wherein the amount of the carbon formation suppressant combined with the fuel gas exceeds that which prevents carbon formation at the temperature of the preheated fuel gas and carbon suppressant mixture.

Transportation of the fuel and the combustion air separately to the portion of the wellbore to be heated permits the gases to be heated to a temperature greater than the autoignition temperature of the mixture. Combining the gases at a temperature greater than the autoignition temperature, along with rapid mixing of the fuel with the combustion air, provides a flameless combustion. Elimination of the flame eliminates the flame as a source of radiant energy and greatly simplifies the construction of the heater, and results in a more even distribution of heat from the burner.

Additional fuel gas is preferably mixed with the combustion products at points within the borehole after the initial point of mixing. This permits the formation to be heated over a greater distance, and permits additional heat to be injected without increasing the temperature which the borehole equipment must be designed to withstand. Staged burning also reduces the amount of nitrous oxide produced by providing some reburning of nitrous oxides back to nitrogen.

A carbon formation suppressant is required because the fuel gas can be heated to a temperature which favors formation of carbon from hydrocarbons. Acceptable carbon formation suppressants include carbon dioxide, water and hydrogen. Carbon dioxide and water are preferred due to lower cost.

The flameless combustion of the present invention also results in minimal production of nitrous oxides.

Other measures to remove or prevent the formation of nitrous oxides are therefore not required.

DETAILED DESCRIPTION OF THE INVENTION

Injectors utilizing flameless combustion of fuel gas at temperature levels of about 900° to about 1100° C. may be fabricated from high temperature alloys such as, for example, WASPALLOY, INCONEL 601, INCONEL 617, INCOLOY 800HT, HASTELLOY 235, UNIMET 500 and INCOLOY DS. At higher temperatures ceramic materials are preferred. Ceramic materials with acceptable strength at temperatures of 900° to about 1400° C. are generally high alumina content ceramics. Other ceramics that may be useful include chrome oxide, zirconia oxide, and magnesium oxide based ceramics. National Refractories and Minerals, Inc., Livermore, Calif., A. P. Green Industries, Inc., Mexico, Missouri, and Alcoa, Alcoa Center, Penn., provide such materials.

Generally, flameless combustion is accomplished by preheating combustion air and fuel gas so that when the two streams are combined the temperature of the mixture exceeds the autoignition temperature of the mixture, but to a temperature less than that which would result in the oxidation upon mixing being limited by the rate of mixing. Preheating of the streams to a temperature between about 850° C. and about 1400° C. and then mixing the fuel gas into the combustion air in relatively small increments will result in flameless combustion. The increments in which the fuel gas is mixed with the combustion gas stream preferably result in about a 20° to 100° C. temperature rise in the combustion gas stream due to the combustion of the fuel.

Figure 1:
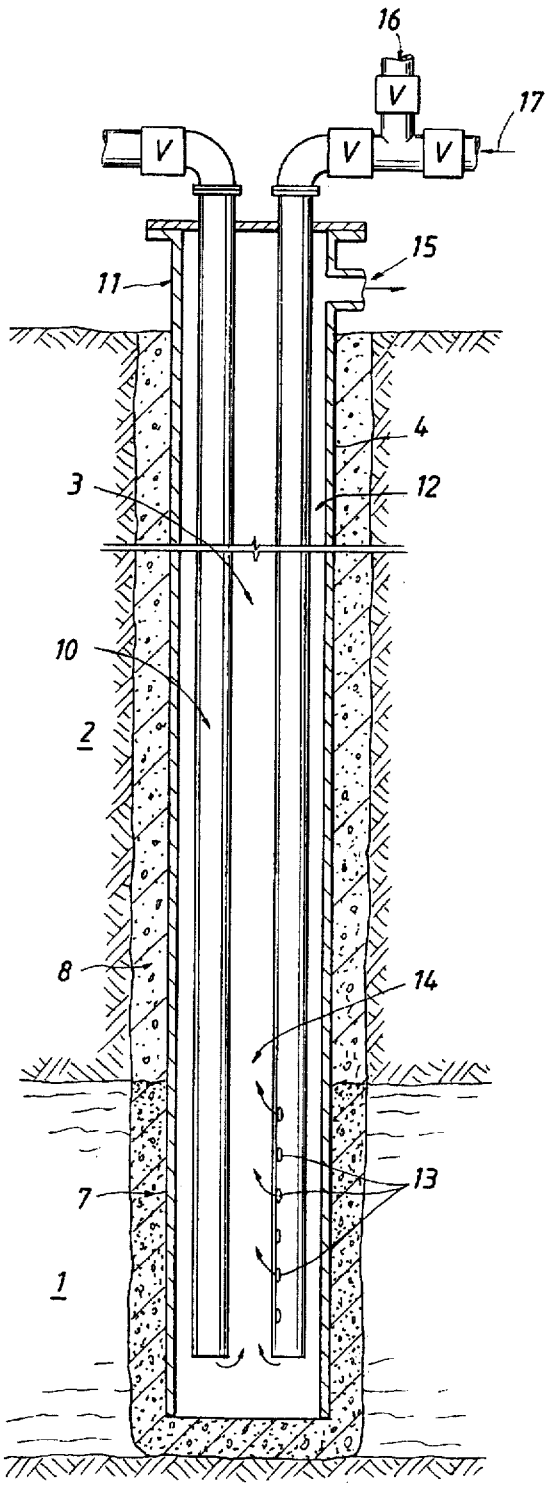
FIGS. 1 through 5 show burners suitable for use in the present invention.

Referring to FIG. 1, a heat injection well and burner capable of carrying out the present invention are shown. A formation to be heated, 1, is below an overburden, 2. A wellbore, 3, extends through the overburden and to the bottom of the formation to be heated. A vertical well is shown, but the wellbore could be deviated or horizontal. Horizontal heat injector wells may be provided in formations that fracture horizontally to recover hydrocarbons by a parallel drive process. Shallow low oil shale formations are examples of such formations. In the embodiment shown in FIG. 1, the wellbore is cased with a casing, 4. The lower portion of the wellbore may be cemented with a cement, 7, having characteristics suitable for withstanding elevated temperatures and transferring heat. A cement which is a good thermal insulator, 8, is preferred for the upper portion of the wellbore to prevent heat loss from the system. A combustion air conduit, 10, extends from the wellhead, 11 to the lower portion of the wellbore. A fuel gas conduit, 12, also extends from the wellhead the bottom of the wellbore.

High temperature cements suitable for cementing casing and conduits within the high temperature portions of the wellbore are available. Examples are disclosed in U.S. Pat. Nos. 3,507,332 and 3,180,748. Alumina contents above about 50 percent by weight based on cements slurry solids are preferred.

Thermal conductivity of these cements can be increased by including graphite in the cement slurry. Between about 10 and about 50 percent by weight of graphite will result in a significant improvement in thermal conductivity. Cement slurries that contain graphite are also of a significantly lower density than high alumina slurries and generally are less expensive than high alumina slurries. The lower density slurry enables conventional cementing of wellbores whereas heavier slurries often required staged cementing. Staged cementing requires considerable rig time. Graphite containing cements are not particularly strong, and are therefore not preferred when high strength is required. When a substantial casing is utilized, high strength cement is not required and high graphite cement is preferred.

Choice of a diameter of the casing, 4, in the embodiment of FIG. 1 is a trade off between the expense of the casing, and the rate at which heat may be transferred into the formation. The casing, due to the metallurgy required, is generally the most expensive component of the injection well. The heat that can be transferred into the formation increases significantly with increasing casing diameter. A casing of between about 4 and about 8 inches in internal diameter will typically provide an optimum trade-off between initial cost and heat transfer. The casing, 4, could optionally be provided with means to provide communication between the outside of the casing and the inside of the casing after the well is brought up to operation temperatures. Such means would relieve pressure from the outside of the casing. These pressures are generated by formation gases that permeate the cement. Relieving these pressures could permit the use of casings having thinner walls. Means to provide communication may be, for example, partially milled portions which fail at operation temperatures and pressures, or plugs of aluminum or polymers that melt or burn at service temperature and pressure. The plugs or milled portions would serve to keep cement out of the casing while the casing is being cemented into place.

The fuel gas conduit contains a plurality of orifices, 13, along the length of the conduit within the formation to be heated. The orifices provide communication between the fuel gas conduit and the combustion air conduit. A plurality of orifices provide for distribution of heat release within the formation to be heated. The orifices are sized to accomplish a nearly even temperature distribution within the casing. A nearly even temperature profile within the casing results in more uniform heat distribution within the formation to be heated. A nearly uniform heat distribution within the formation will result in more efficient utilization of heat in a conductive heating hydrocarbon recovery process. A more even temperature profile will also result in the lower maximum temperatures for the same heat release. Because the materials of construction of the burner and well system dictate the maximum temperatures, even temperature profiles will increase the heat release possible for the same materials of construction. The number of orifices is limited only by size of orifices which are to be used. If more orifices are used, they must generally be of a smaller size. Smaller orifices will plug more easily than larger orifices. The number of orifices is a trade-off between evenness of the temperature profile and the possibility of plugging.

Alternatively, air could be staged into fuel gas by providing orifices in the combustion air conduit instead of the fuel conduit.

Fuel gas and combustion air transported to bottom of the wellbore combine and react within the wellbore volume surrounding the conduits, 14, forming combustion products. The combustion products travel up the wellbore and out an exhaust nozzle, 15, at the wellhead. From the exhaust nozzle, the combustion products may be routed to atmosphere through an exhaust stack (not shown). Alternatively, the combustion gases may be treated to remove pollutants. Energy recovery from the combustion products by an expander turbine or heat exchanger may also be desirable.

As the combustion products rise in the wellbore above the formation being heated, they exchange heat with the combustion air and the fuel gas traveling down the flow conduits. This heat exchange not only conserves energy, but permits the desirable flameless combustion of the present invention. The fuel gas and the combustion air are preheated as they travel down the respective flow conduits sufficiently that the mixture of the two streams at the ultimate mixing point is at a temperature above the autoignition temperature of the mixture. Flameless combustion results, avoiding a flame as a radiant heat source. Heat is therefore transferred from the wellbore in an essentially uniform fashion.

The preheating of the fuel gases to obtain flameless combustion would result in significant generation of carbon within the fuel gas conduit unless a carbon formation suppressant is included in the fuel gas stream. Nozzles for injection of fuel gas and oxidant suppressant are shown in FIG. 1 as 16 and 17 respectively. The carbon formation suppressant may be carbon dioxide, steam, hydrogen or mixtures thereof. Carbon dioxide and steam are preferred due to the generally higher cost of hydrogen.

Carbon is formed from methane at elevated temperatures according to the following reaction:

$$CH_4 \rightarrow C + 2H_2$$

This reaction is a reversible reaction, and hydrogen functions as carbon formation suppressant by the reverse reaction.

Carbon dioxide suppresses carbon formation by the following reaction:

$$CO_2 + C \rightarrow 2CO$$

Steam suppresses carbon formation by the following reactions:

$$H_2O + C \rightarrow CO + H_2$$

$$2H_2O + C \rightarrow CO_2 + 2H_2$$

The carbon dioxide and the carbon monoxide remain in equilibrium at elevated temperatures according to the shift gas reaction:

$$CO + H_2O \leftrightarrows CO_2 + H_2$$

When the fuel gas is essentially methane, a molar ratio of about 1:1 of steam to methane will be sufficient to suppress carbon formation to temperatures of about 2500° F. and a molar ratio of about 1.15:1 of carbon dioxide to methane is sufficient to suppress carbon formation. The molar rations of steam to methane is preferably within the range of about 1:1 to about 2:1 when steam is utilized as the carbon formation suppressant. The molar ratio of carbon dioxide to methane is preferably within the range of about 1:1 to about 3:1 when carbon dioxide is utilized as the carbon formation suppressant. The fuel gas preferably consists essentially of methane due to methane being more thermally stable than other light hydrocarbons. The suppressant is additionally beneficial because it lowers combustion rates and reduces peak temperatures.

Figure 2:
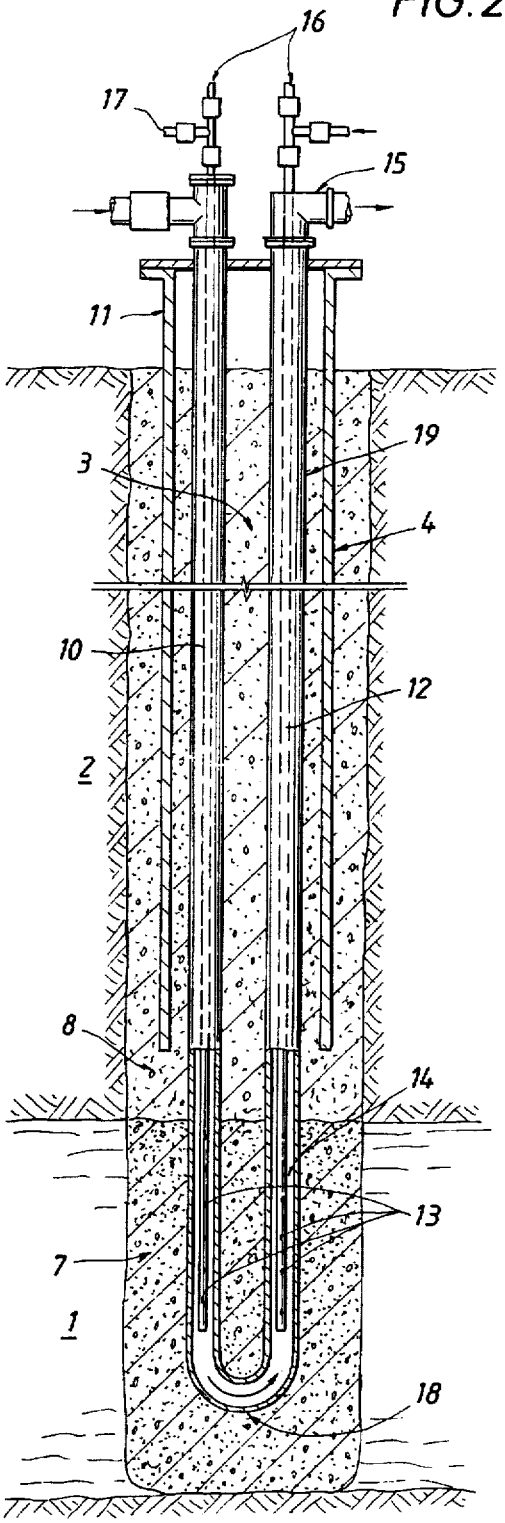

Referring now to FIG. 2, an alternative apparatus capable of carrying out the present invention is shown with elements numbered as in FIG. 1. In the embodiment of FIG. 2, the combustion products rise to the surface thought a separate conduit, 19, rather than through the wellbore surrounding the air conduit, 10. The combustion product return conduit and the combustion air conduit are separate conduits connected a the bottom of the wellbore by a cross-over, 18. Fuel gas is provided through a fuel gas conduit, 12, within the combustion product return conduit, 19, and the combustion air conduit, 10. Alternatively, the fuel gas conduit could be within one of the two other conduits. The combustion product return conduit and the combustion air conduit are cemented directly into the formation to be heated, 2, by a high temperature cement, 7. If the combustion air and combustion gases conduits are sufficiently strong that they do not required significant support from the cement, a cement containing a high level of graphite can be utilized. This configuration should be considerably less expensive to provide due to the absence of a large diameter casing within the high temperature portion of the wellbore. The two smaller conduits, when separated laterally within the wellbore, can transfer heat into the formation more effectively than a single conduit having the same surface area.

The flow conduits may be made from steel, high temperature alloys such as INCOLOY, INCONEL or HASTALLOY or ceramics, depending upon the operating temperatures and service life desired. Ceramics are preferred as a material of construction for casings and flow conduits of the present invention when injection of heat at temperature levels above about 1100° C. are desired.

Figure 3:
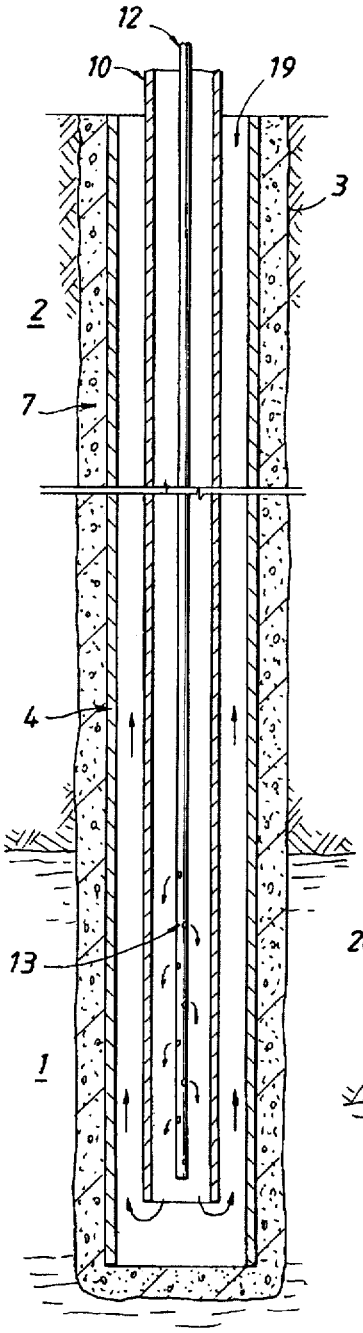

Referring to FIG. 3, with elements numbered as in FIG. 1, a preferred embodiment utilizing metal alloy flow conduits is shown. The formation to be heated, 1, below an overburden, 2, is shown penetrated by a wellbore, 3, of about twelve inches in diameter. In this embodiment, the wellbore is cased with a sacrificial carbon steel casing, 4, of about eight inches in diameter. The casing is cemented into place using a high temperature cement, 7, which forms an outer perimeter of the flow channel through which combustion gases travel up the wellbore. The cement is preferably one such as PERMACON, a high alumina cement available from National Refractories and Minerals, Inc. of Livemore, Calif. A combustion air conduit, 10, in this embodiment is made from an alloy such as INCOLOY and is centralized within the casing. The combustion air conduit could be, for example, a three to four inch diameter tube. A fuel gas conduit, 12, is centralized within the combustion air conduit. The fuel gas conduit can be made from an alloy such as INCOLOY and could be about three quarters of an inch in diameter. Combustion occurs in the annulus between the fuel gas conduit, and the combustion air conduit, 12. At the lower end of the formation to be heated, within the wellbore, the combustion air conduit is in communication with the annulus between the combustion air conduit, 10, and the casing. This annulus provides a flow path for combustion products to travel back up the wellbore to the surface.

The embodiment of FIG. 3 provides for conventional centralization of the flow conduits, and conventional replacement of the fuel gas line and combustion air line if such replacement becomes necessary.

Figure 4:
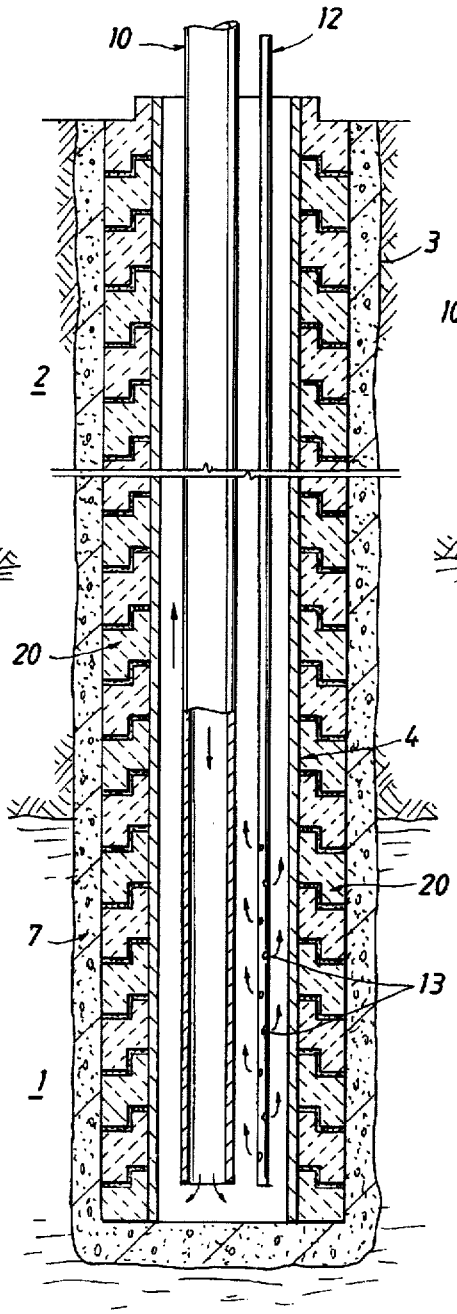

Referring now to FIG. 4, with elements numbered as in FIG. 1, a preferred embodiment of a burner is shown utilizing stacked annular shaped ceramic bricks to form a combustion gas conduit. A wellbore, 3, is shown extending into a formation to be heated, 1, under an overburden, 2. A casing of a sacrificial material, 4, is utilized to initially hold the ceramic bricks, 20, in place. The ceramic bricks can be about three inches in wall thickness and each about five to ten feet in height. The bricks may be made of a high alumina ceramic material, and may be sealed together with a high alumina mortar. A combustion air conduit, 10, provides a flow path for combustion air to the lower portion of the formation to be heated. The combustion air conduit is open and in communication with the annulus between the combustion air conduit and the ceramic bricks near the bottom of the formation to be heated. A fuel gas conduit, 12, directs fuel gas into the volume defined by the casing in increments through orifices, 13, to provide for oxidation of the fuel gas in relatively small increments. The fuel gas conduit and the combustion air conduit may be ceramic if operating temperatures are to be above about 1100° C. If operating temperatures are to be about 1100° C. or less, the flow conduits can be fabricated from an alloy such as INCOLOY. The ceramic bricks are typically cemented into place within the wellbore with a high temperature cement and preferably a graphite containing high alumina cement.

Figure 5:
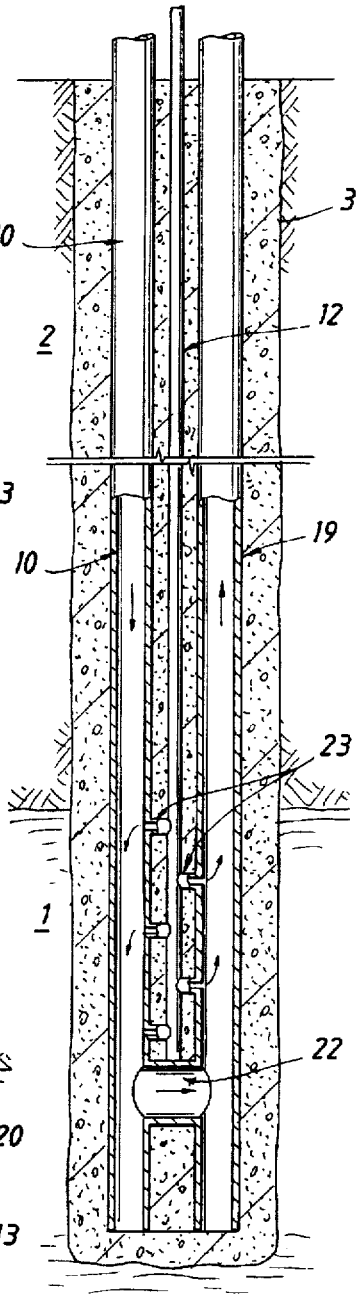

Referring now to FIG. 5, another embodiment of a preferred heat injector is shown with elements numbered as in FIG. 1. This embodiment is preferred when the heat injector is to be injecting heat at temperatures of about 1100° C. to about 1365° C. In this embodiment, the combustion air conduit, 10, the combustion gas conduit, 19, and the fuel gas conduit are all initially sacrificial materials cemented into place. The cement is a high temperature cement. A high graphite content cement is not preferred in this embodiment due to the lower strength of the high graphite cements. A channel, 22, near the bottom of the formation to be heated provides communication between the combustion air conduit and the combustion gas conduit. Communication between the fuel gas conduit, 12, and the combustion gas conduit and the combustion air conduit is provided through conduits such as alloy tubes, 23, that may contain orifices (not shown) to restrict flow of fuel gas into the larger flow conduits. Combustion of the fuel gas occurs both in the downflow combustion air conduit, 10, an in the up flow combustion gases conduit, 19. Within the formation to be heated, 1, the combustion gas and the combustion air conduit are spaced as far apart as practical in order to maximize the amount of heat which can be transferred to the formation at any maximum operating temperature.

The embodiment of FIG. 5 could include a ceramic fuel gas conduit or a sacrificial conduit which is eliminated prior to or during initial operation, leaving the cement defining a conduit. The sacrificial conduit may be eliminated by, for example, oxidation, melting, or milling. A plurality of fuel gas conduits could optionally be provided. A plurality of fuel gas conduits could provide redundancy, and could reduce the total length of tubes, 23, which are required. In the embodiment of FIG. 5, the wellbore, 3, could be of about a sixteen inch diameter within the formation to be heated, and contain about a three to four inch internal diameter combustion air conduit, a combustion gas conduit of about three to about four inch diameter, and one or preferably two fuel gas conduits of about three quarters inch diameter. Orifices in the alloy tubes, 23, are sized to achieve a fuel gas flow that would result in a nearly uniform temperature profile within the wellbore.

When ceramic materials are utilized for construction of the heat injectors, the larger conduits (combustion air and combustion product conduits) may initially be sacrificial materials such as polymeric, fiberglass, or carbon steel. The sacrificial conduits can be cemented into place using high alumina cements. The high alumina cement forms the conduit which remains in place after the sacrificial materials are removed.

High alumina ceramic tubes are available that have tensile strength sufficient to permit suspension of the conduits from a rig at the surface. These ceramic conduits can be lowered into the wellbore as sections are added at the surface. The sections can be joined by mortar and held together by sacrificial clamps until the mortar has cured. The ceramic tubes could also be held in place by sacrificial pipes until they are cemented into place.

Cold start-up of a well heater of the present invention may utilize combustion with a flame. Initial ignition may be accomplished by injecting pyrophoric material, an electrical igniter, a spark igniter, or temporally lowering an igniter into the wellbore. The burner is preferably rapidly brought to a temperature at which a flameless combustion is sustained to minimize the time period at which a flame exists within the wellbore. The rate of heating up the burner will typically be limited by the thermal gradients the burner can tolerate.

Flameless combustion generally occurs when a reaction between an oxidant stream and a fuel is not limited by mixing and the mixed stream is at a temperature higher than the autoignition temperature of the mixed stream. This is accomplished by avoiding high temperatures at the point of mixing and by mixing relatively small increments of fuel into the oxidant containing stream. The existence of flame is evidenced by an illuminate interface between unburned fuel and the combustion products. To avoid the creation of a flame, the fuel and the oxidant are preferably heated to a temperature of between about 1500° F. and about 2500° F. prior to mixing. The fuel is preferably mixed with the oxidant stream in relatively small increments to enable more rapid mixing. For example, enough fuel may be added in an increment to enable combustion to raise the temperature of the stream by about 50° to about 100° F.

Figure 6:
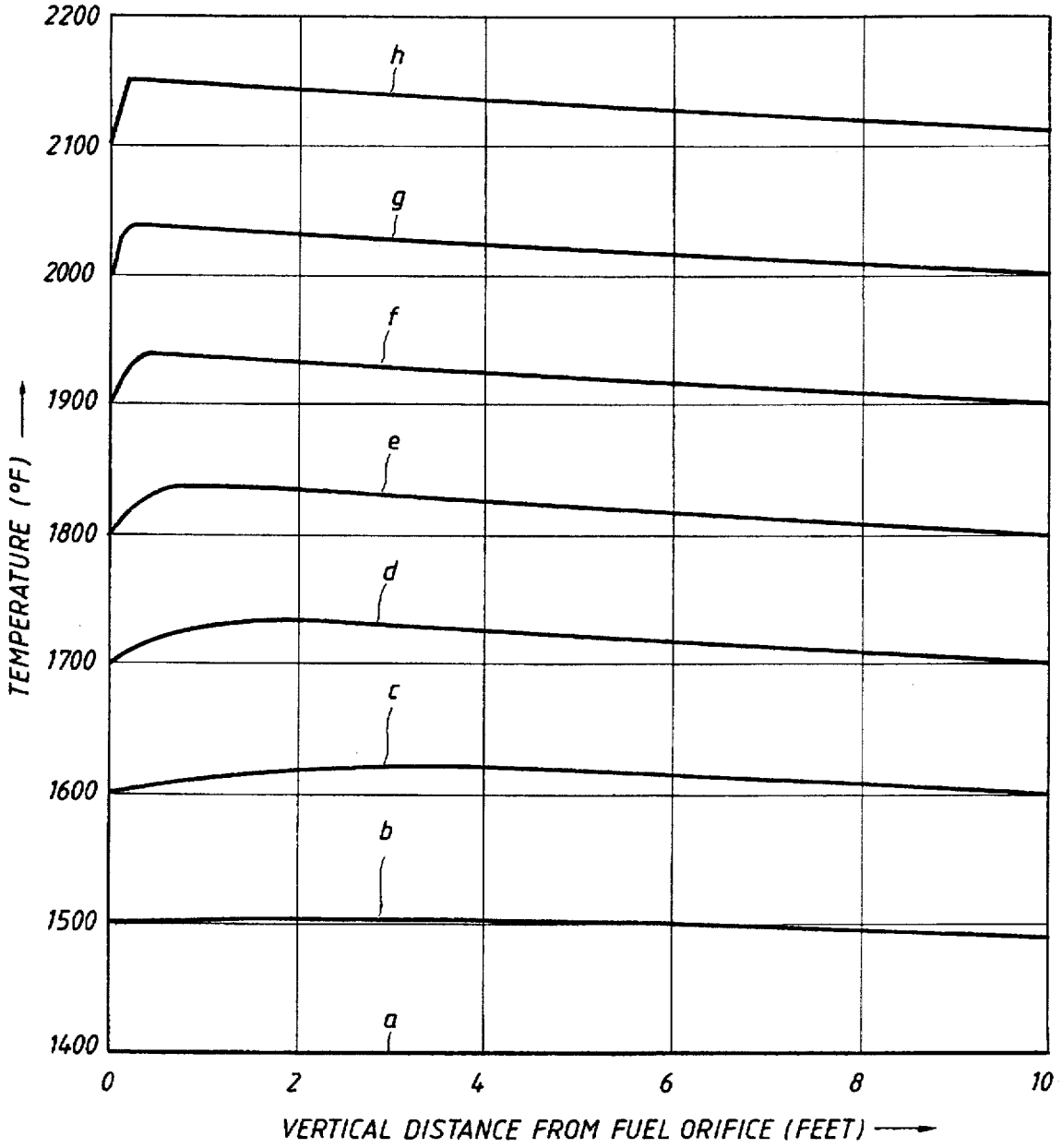
FIG. 6 is a plot of temperature profiles along a burner at various temperatures.

FIG. 6 is a plot of calculated temperatures as a function of distance from a mixing point in a cylindrical combustion chamber. The cylindrical combustion chamber is of an eight inch internal diameter, and a flow of 220 standard cubic feet per minute (standard at 60° F. and one atmosphere pressure) of combustion gases containing three percent by volume of oxygen is mixed with enough methane that combustion of the methane would increase the temperature of the stream by 10° F. Both the methane and the combustion gases are initially at the same temperature. Mixing of the methane and the combustion gases is assumed to be rapid. Heat is removed from the combustion chamber at a rate of about 375 watts per foot of length. Temperature profiles shown as lines a through h represent temperature profiles for gases starting at temperatures of 1400° F. through 2100° F. in one hundred degree fahrenheit respectively.

FIG. 6 demonstrates that under these conditions, the reaction between methane and oxygen occurs at a useful rate. Flameless at a temperature less than about 1500° F. would require a longer residence time than that provided by an eight inch diameter chamber at a low pressure in order to provide heat to a formation at a rate greater than about 375 watts per foot. Reaction of the fuel and oxygen is very quick at 2100° F.

EXAMPLE

Flameless combustion was demonstrated by injection of natural gas into a stream of exhaust gasses in an amount sufficient for combustion to raise the temperature of the gas stream by about 50° F. The exhaust gas stream contained about 3.6 molar percent oxygen and was at a temperature of about 1550° F. The combined stream was analyzed for carbon monoxide and hydrocarbons at a point downstream of the mixing. The residence time was about 0.3 seconds. About 40 ppm carbon monoxide was detected in the sample but no hydrocarbons were detected. The combustion was flameless.

I claim:

1. A method of heating a subterranean formation comprising at least one borehole providing communication from the surface to the subterranean formation to be heated, the method comprising:

combining a hydrocarbon fuel gas with a carbon formation suppressant;

passing the fuel gas and carbon formation suppressant mixture through a fuel gas conduit to a mixing point within the borehole juxtapose to the formation to be heated;

passing a combustion air stream though an air conduit to the mixing point;

preheating either the fuel gas and carbon formation suppressant mixture, the combustion air stream or both such that the temperature of a mixture of the streams exceeds an autoignition temperature of the mixture of the streams;

combining the preheated combustion air and fuel gas and carbon formation suppressant at the mixing point resulting in autoignition forming combustion products;

passing the combustion products through the borehole from the mixing point to the surface, wherein the amount of the carbon formation suppressant combined with the fuel gas exceeds that which prevents carbon formation at the temperature of the preheated fuel gas and carbon suppressant mixture.

2. The method of claim 1 wherein the fuel gas and carbon formation suppressant mixture and the combustion air are both preheated by heat exchange with the combustion products flowing from the mixing point to the surface.

3. The method of claim 2 wherein additional preheated fuel gas and carbon formation suppressant is mixed with the combustion products in the borehole between the mixing point and the surface at points that are juxtapose to the formation to be heated.

4. The method of claim 2 wherein the fuel gas consists essentially of methane.

5. The method of claim 4 wherein the fuel gas and carbon formation suppressant mixture and the combustion air are both heated to a temperature above about 1000° F.

6. The method of claim 5 wherein the carbon formation suppressant comprises water and the mole ratio of water to carbon in the stream is greater than about 1.

7. The method of claim 5 wherein the carbon formation suppressant comprises carbon dioxide and the mole ratio of carbon dioxide to fuel gas carbon is greater than about 1.

8. The method of claim 5 wherein the carbon formation suppressant comprises a mixture of carbon dioxide and water.

*9. A method of supplying heat using a flameless combustor, the method comprising:*

*combining a hydrocarbon fuel gas with a carbon formation suppressant;*

*passing the fuel gas and carbon formation suppressant mixture through a fuel gas conduit to a mixing point within the flameless combustor;*

*passing a combustion air stream though an air conduit to the mixing point;*

*preheating either the fuel gas and carbon formation suppressant mixture, the combustion air stream or both such that the temperature of a mixture of the streams exceeds an autoignition temperature of the mixture of the streams; and*

*combining the preheated combustion air and fuel gas and carbon formation suppressant at the mixing point resulting in autoignition forming combustion products,*

*wherein the amount of the carbon formation suppressant combined with the fuel gas exceeds that which prevents carbon formation at the temperature of the preheated fuel gas and carbon suppressant mixture.*

* * * * *